Figure 1:
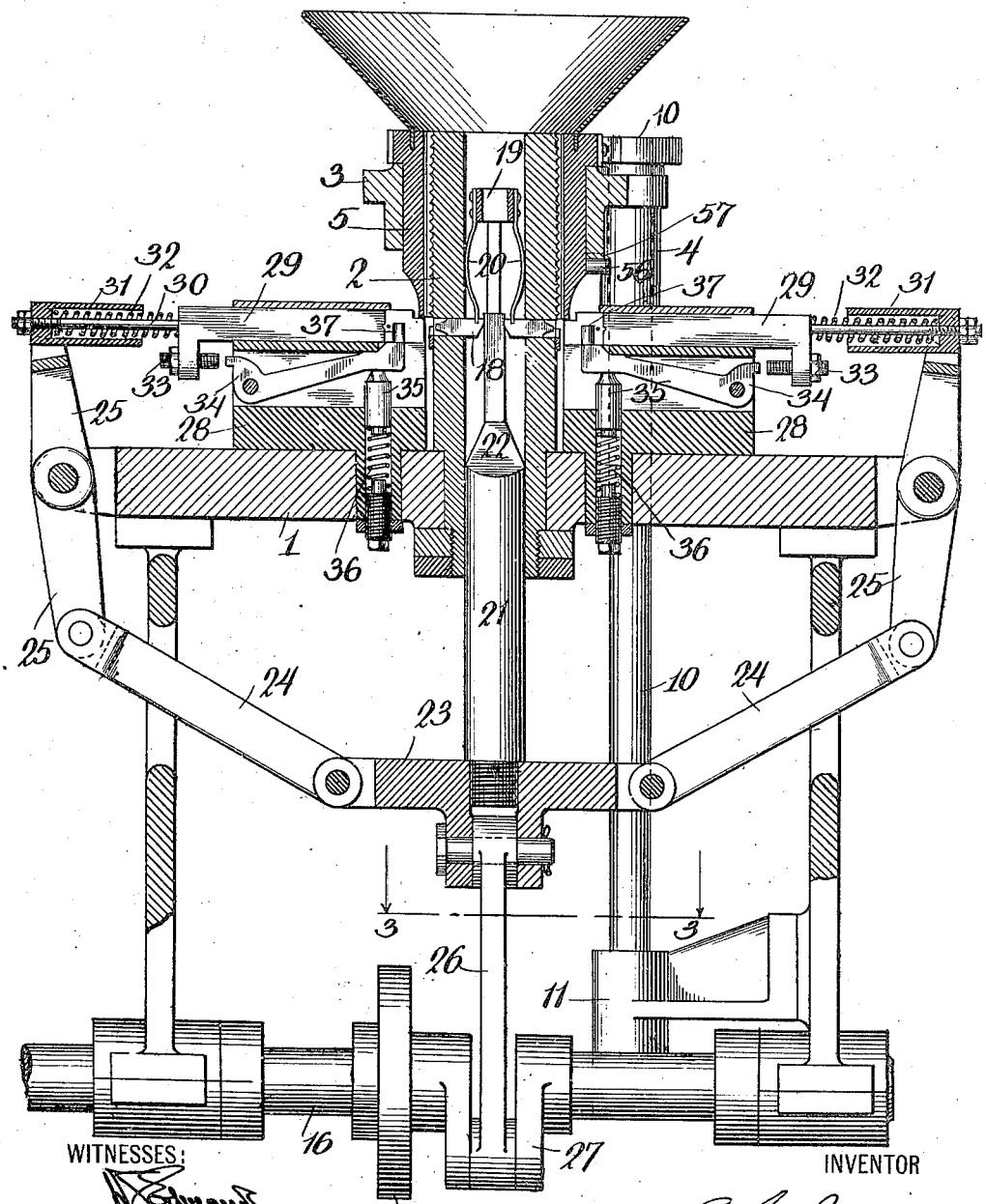

A. C. PRATT.
MACHINE FOR MAKING LINK MESH.
APPLICATION FILED MAR. 10, 1909.

948,615.

Patented Feb. 8, 1910.
5 SHEETS—SHEET 2.

WITNESSES:

INVENTOR
A. C. Pratt
BY
ATTORNEYS

A. C. PRATT.
MACHINE FOR MAKING LINK MESH.
APPLICATION FILED MAR. 10, 1909.
948,615.
Patented Feb. 8, 1910.
5 SHEETS—SHEET 3.
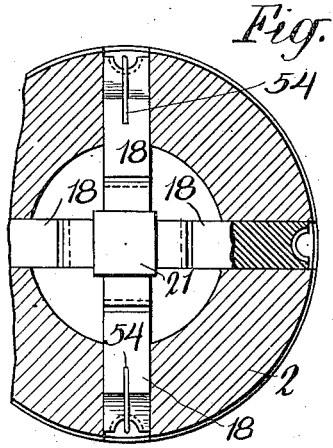
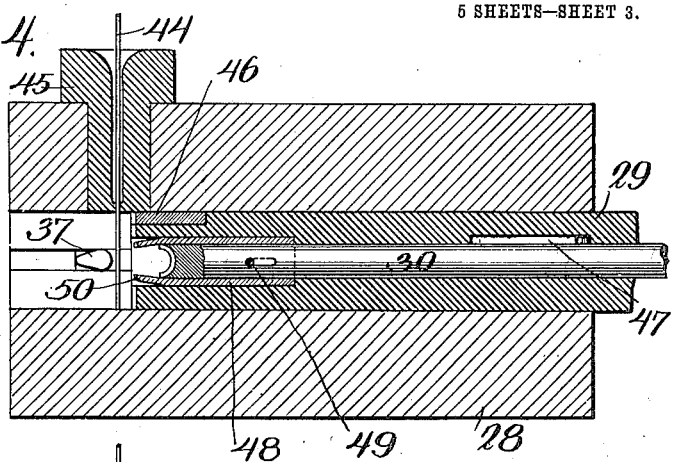
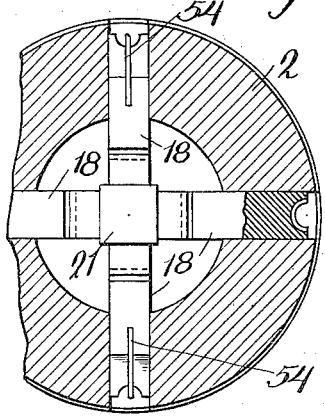
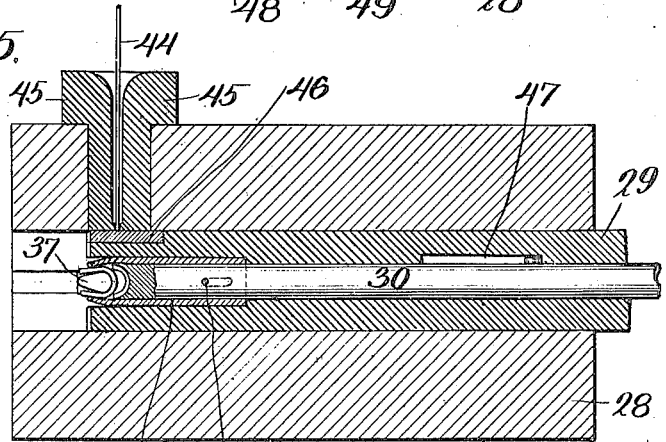
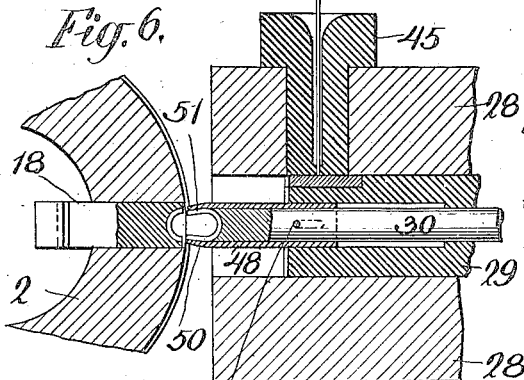
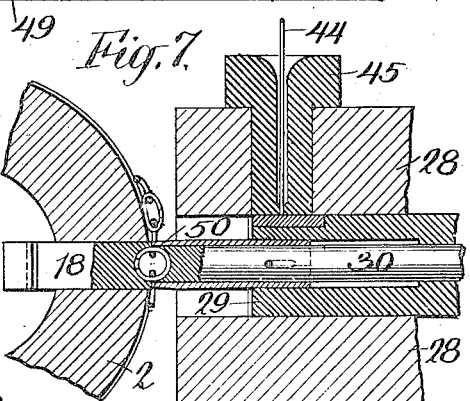
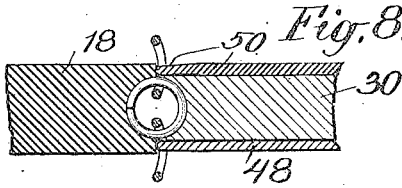
WITNESSES:
INVENTOR
A. C. Pratt
BY
ATTORNEYS A. C. PRATT.
MACHINE FOR MAKING LINK MESH.
APPLICATION FILED MAR. 10, 1909.
948,615.
Patented Feb. 8, 1910.
5 SHEETS—SHEET 4.
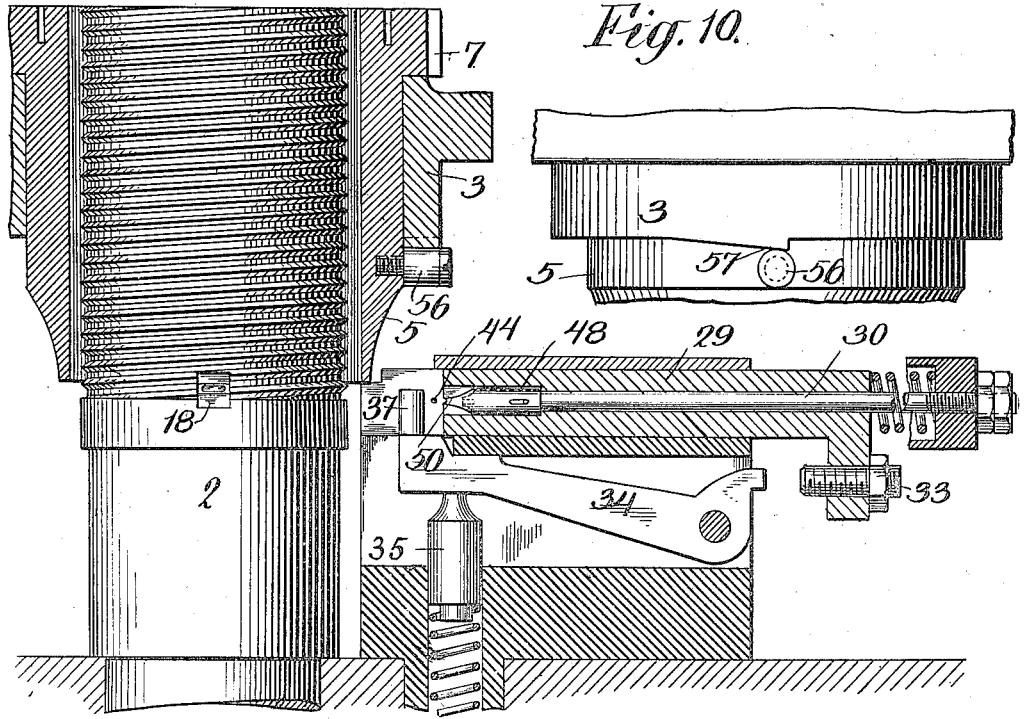
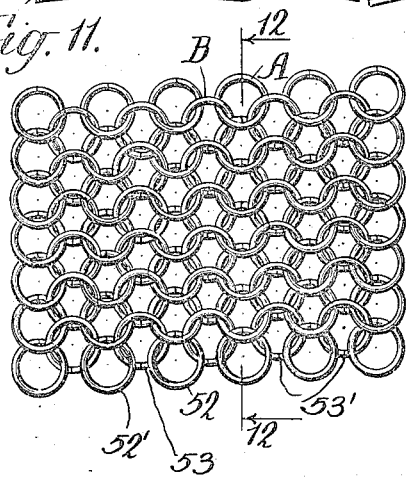
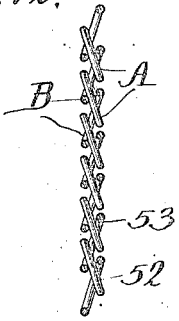
WITNESSES:
INVENTOR
A. C. Pratt
BY
ATTORNEYS A. C. PRATT.
MACHINE FOR MAKING LINK MESH.
APPLICATION FILED MAR. 10, 1909.
948,615.
Patented Feb. 8, 1910.
5 SHEETS—SHEET 5.
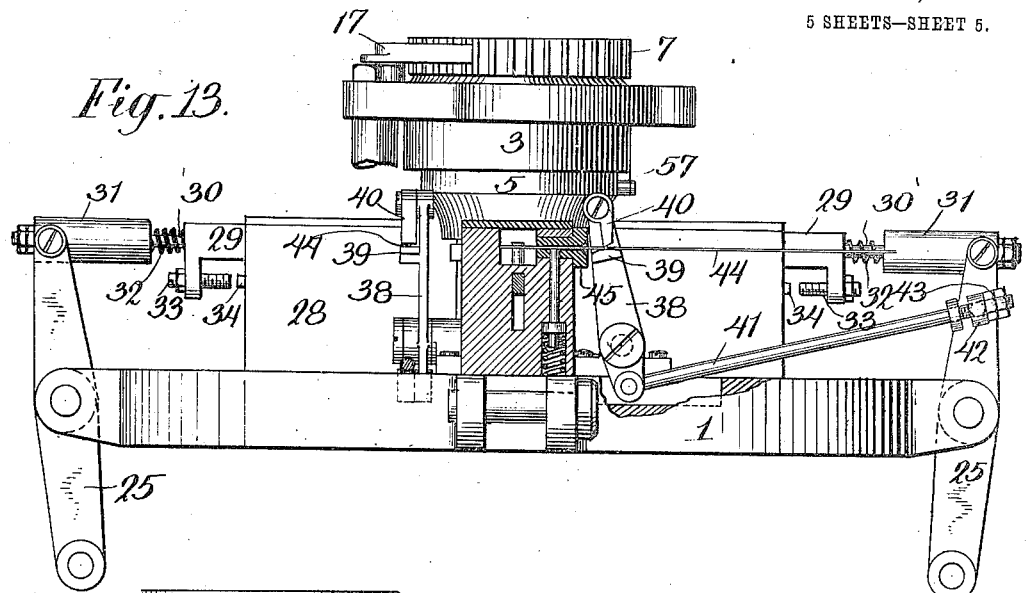
Fig. 13.
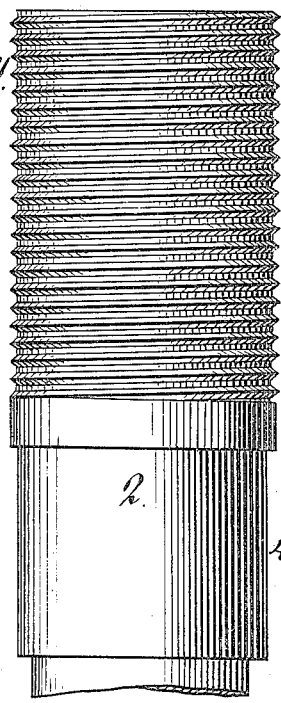
Fig. 14.
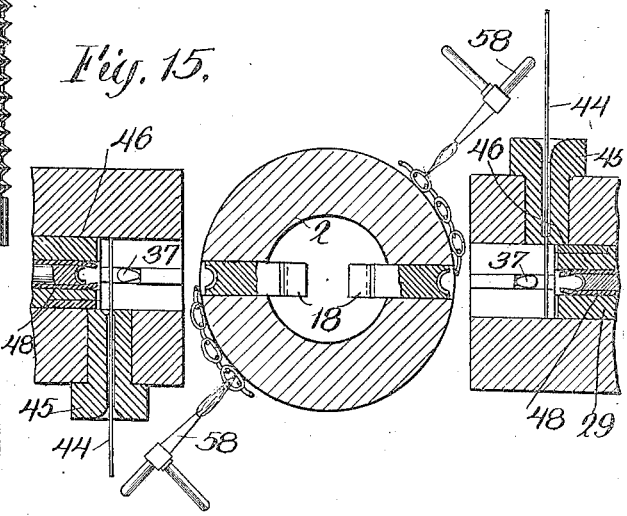
Fig. 15.
WITNESSES:
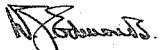
INVENTOR
A. C. Pratt
BY
Edmonds
ATTORNEYS

UNITED STATES PATENT OFFICE.

ALONZO COMSTOCK PRATT, OF NEWARK, NEW JERSEY.

MACHINE FOR MAKING LINK MESH.

948,615.

Specification of Letters Patent.   Patented Feb. 8, 1910.

Application filed March 10, 1909.   Serial No. 482,634.

*To all whom it may concern:*

Be it known that I, ALONZO COMSTOCK PRATT, a citizen of the United States, residing at Newark, in the county of Essex and State of New Jersey, have invented certain new and useful Improvements in Machines for Making Link Mesh, of which the following is a specification.

This invention relates to machines for making intermeshing links from strips of wire and is directed particularly to the provision of a machine for making fabric of the character known as "ring-mesh." This mesh consists of a multiplicity of rings or links each linked with a plurality of other links.

The invention involves the provision of a support for the portion of the mesh which has been made and forming-tools for making additional links meshing with those which have been made in accordance with the design of the fabric. This support and the forming-tools are moved relatively step by step so that the successive links made by the tools are added to the mesh in the proper manner and at the proper points. Thus, the support for the fabric which has been made may be moved step by step a distance proportional to the spacing of the links of the mesh, and when one row of links has been completed, the support may be moved relatively to the tools to a position for adding another row. Such an arrangement of the parts may be employed in making a flat strip of the ring-mesh fabric, but in the preferred embodiment of my invention, I employ parts so constructed that the fabric is made in the form of a sleeve and in this sleeve the links of the mesh are arranged in a spiral, as in making a mesh of this character the relative movement of the support for the fabric and the forming-tools may be the same in every case instead of being the same only throughout the operation of making the links of a single row. In a machine for making such ring-mesh in the form of a sleeve with the links spirally arranged, I employ a supporting device for the fabric consisting of a mandrel having a spiral thread thereon corresponding with the spiral arrangement of the links, and the sleeve of the mesh is caused to move about this mandrel step by step so that each time the forming-tools operate they will add a link at the proper point. In a sleeve of the ring-mesh thus made, there are ridges and depressions running lengthwise of the sleeve and formed by the lines of links and the rotation of the sleeve upon the mandrel may be caused by intermittently rotating a part which surrounds the sleeve upon the mandrel and whose surface is provided with longitudinally extending ridges coacting with the longitudinal depressions in the mesh. Each time the mesh comes to rest after one of its movements, the forming-tools are automatically operated to form a link from a strip of wire in such manner as to cause this link to mesh with the desired links which have already been added to the fabric. The wire for the links is preferably fed to the forming-tools automatically from a continuous strand of wire and a piece of the proper length is cut off and bent by the tools to the proper configuration. In combination with these parts, I may employ a soldering device for uniting the ends of each piece of wire which is used to form a link. This soldering device may be of any suitable type as for instance an electric welding device or a blowpipe flame, and in the latter case either soldering material may be applied to the joint between the ends of the piece of wire before the flame is applied for reducing the metal at this point, or the wire used may have a sufficient amount of soldering material therein to permit of welding together the ends of a piece of wire by merely applying the torch thereto.

I have illustrated one embodiment of my invention in the accompanying drawings in which—

Figure 2:
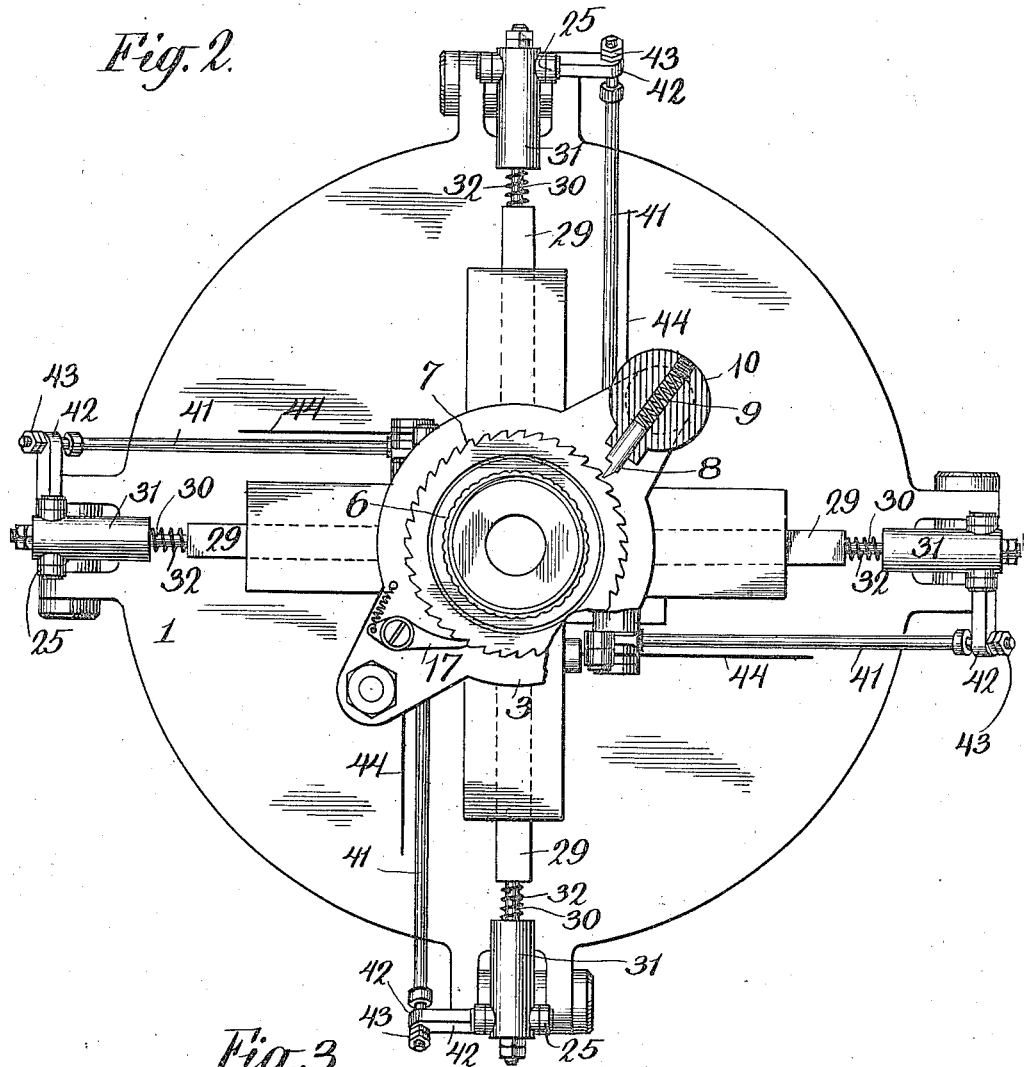
Figure 3:
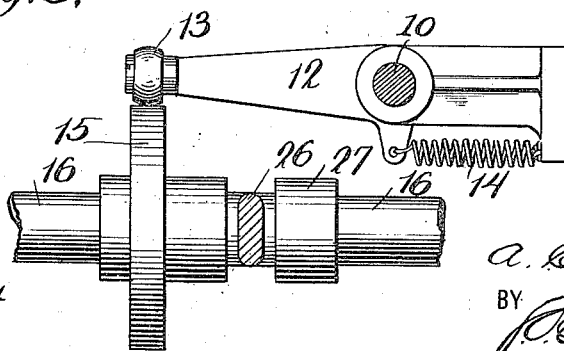

Figure 1 is a sectional elevation of the machine, Fig. 2 is a top view of the same broken away and sectioned in part, Fig. 3 is a detail view in section on line 3—3 of Fig. 1, Figs. 4, 5, 6, 7 and 8 are horizontal sectional views through the forming-tools showing the sequence of operation of these parts, Fig. 9 is a vertical section through one of the forming-tools and the support for the mesh, Fig. 10 is a detail view in elevation of a portion of the mechanism shown in Fig. 9, Fig. 11 is a view of the mesh made on the machine, Fig. 12 is a section on line 12—12 of Fig. 11, Fig. 13 is a sectional elevation showing the wire-feeding mechanism, and Figs. 14 and 15 are detail views illustrating a modification.

Referring to these drawings, 1 indicates a table on which is mounted a mandrel 2 the upper portion of which is provided with spirally arranged grooves, as best shown in Fig. 9, the number of these spiral grooves depending upon the number of pairs of forming-tools employed; in Figs. 1 to 13 inclusive I have shown a machine provided with four sets of forming-tools; the mandrel 2 is, therefore, provided with two spirally arranged grooves upon the surface thereof, the size of these grooves being proportioned to the size of the links used in making the mesh. A ring 3 is supported upon the table 1 by means of posts 4 and forms a bearing for a sleeve 5 which fits within the ring. On the interior surface of the sleeve 5 are a plurality of ridges and depressions, as shown at 6 in Fig. 2, these extending in the direction of the axis of the sleeve. The sleeve of ring-mesh made by the machine is adapted to lie in the narrow space between the sleeve 5 and the mandrel 2 and the ridges 6 upon the interior surface of the sleeve 5 are adapted to project into the shallow depressions between the lines of rings of the mesh so that when sleeve 5 is rotated it will cause the sleeve of mesh to rotate with it; and as the spirally arranged ridges on the mandrel 2 project into the corresponding depressions on the inner side of the mesh, it will be evident that when the sleeve of ring-mesh is rotated by the sleeve 5 it will follow the spirally arranged grooves and depressions upon the mandrel 2; in other words, as the sleeve of ring-mesh is rotated about the stationary mandrel 2 it will be caused to move upward vertically by the threads upon the mandrel.

On the exterior of the sleeve 5 are formed ratchet teeth 7 adapted to be engaged by a pawl 8 pressed forward by a spring 9 in an opening formed in a shaft 10. This shaft extends downwardly through an opening in the post 4 and a bearing 11 secured to the frame of the machine, and at its lower end has a bell-crank lever 12 secured thereto. One end of this lever carries a roller 13 which is held by a spring 14 secured to the other end of lever 12 against the periphery of a cam 15, secured upon a shaft 16 which is driven from any suitable source of power. Thus, in each rotation of shaft 16 and cam 15 the shaft 10 is rocked in its bearings and the pawl 8 carried thereby causes the sleeve 5 to rotate a distance equal to one of the teeth of the rack 7, and in this position sleeve 5 is held by a spring-pressed retaining pawl 17.

The mandrel 2 is hollow and four radial openings are provided therein all in the same transverse plane and equally spaced apart. These four openings receive reciprocating dies 18. Within the mandrel 2 is a ring 19 having four depending spring-fingers 20 secured thereto the ends of which enter notches in the dies 18; these springs are arranged to draw the dies 18 inwardly to the positions in which they are shown in Fig. 1. A plunger 21 is adapted to reciprocate within the opening in mandrel 2 and this plunger has four cam surfaces 22 formed thereon such that when the plunger is raised these cam surfaces will engage the inner ends of the dies 18 and force the dies radially outward against the tension of the springs 20. At its lower end the plunger 21 is secured to a cross-head 23 having four radiating arms the ends of which are pivotally connected to levers 24 whose other ends are pivotally connected to levers 25 pivotally mounted upon the table 1. The cross-head 23 has a connecting rod 26 pivotally connected thereto and the other end of this rod is pivotally connected to cranks 27 upon the shaft 16.

Mounted upon the table 1 are four blocks 28 symmetrically disposed about the mandrel 2 and in each of these blocks is a horizontal opening in which the plunger 29 is adapted to reciprocate. In this plunger is a horizontally disposed opening through which a die-rod 30 is adapted to reciprocate. At its rear end the die-rod 30 is pivotally connected to the upper end of its respective lever 25. The connection between each lever 25 and its die-rod 30 is formed to provide a housing 31 for a spring 32 the end of which is adapted to engage the adjacent end of the plunger 29 and move the plunger forward in the opening in block 28 until further movement of the plunger is arrested and such forward movement of the die-rod 30 and the housing 31 as takes place after the movement of plunger 29 has been arrested, merely results in a further compression of spring 32. On the outer end of the plunger 29 is a depending projection which carries an adjustable screw 33. The end of this screw is adapted to engage one end of a bell-crank lever 34 which is pivotally mounted in an opening on block 28 below the opening for the plunger 29. The other end of the bell-crank lever 34 is normally held in the raised position in which it is shown in Figs. 1 and 9 by a plunger 35 reciprocating in an opening in block 28 and supported by a spring 36. This end of lever 34 carries an anvil 37 which, when lever 34 is in the position in which it is shown in Figs. 1 and 9, lies opposite the end of the plunger 29 and the die-rod 30.

When plunger 29 moves forward in its opening in block 28 the end of screw 33 engages the end of lever 34 and rocks the lever on its pivot against the tension of spring 36 until the upper end of the anvil 37 is below the rod 30, and as this occurs, the end of screw 33 engages the wall of the block 28 on either side of the opening in the block for lever 34 and thus arrests further movement of the plunger 29. When the plunger 29 moves forward thus, it severs a length of wire sufficient for making one link; this wire is fed in through an opening provided for that purpose in the block 28 by means of a wire-feeding device shown in Fig. 13. This device consists of a lever 38 pivotally mounted upon the table 1 and carrying a gripping member 39 and a coacting pivotally mounted gripping member 40. Below its pivot the lever 38 has a rod 41 pivotally connected thereto the opposite end of which extends loosely through an opening in an offset 42 on the lever 25 and has adjustable nuts 43 secured thereon adapted to coact with the offset 42 so that in the movement of lever 25 for retracting the die-rod 30, the end of rod 41 will slide loosely through the offset 42 until at the end of the movement of lever 25 the offset engages nuts 43 and thus actuates the lever 38 to feed the strand of wire 44 forward through the opening provided in block 28. The extent of movement of these parts of the feeding mechanism is such that the wire 44 is fed forwardly a distance equal to the width of the opening in block 28 for the plunger 29 and at the end of this feeding movement the end of the wire bears against the wall of the opening for plunger 29 opposite the wall through which the wire passed. The opening through which the wire is inserted is formed by a bushing 45, preferably made of hardened steel, so that its end may be used as a cutting die. The other member of the cutter is formed on or secured to the plunger 29 and is shown at 46 in Fig. 4. The wire 44 is drawn from a supply reel, and it will be understood that a supply of wire is provided for each of the four sets of forming-tools, as shown in Fig. 2.

In the wall of the opening in the plunger 29 for the die-rod 30 is a lengthwise groove 47 adapted to receive a pin upon the rod 30, as shown in Fig. 4. Near the other end of plunger 29 the opening therethrough is enlarged to provide a space in which is received a sleeve 48 on the rod 30. This sleeve has a slot therein adapted to receive a pin 49 on the rod 30. The end of sleeve 48 extends beyond the end of rod 30 and is cut to provide prongs 50, as shown in Figs. 4 and 9. These prongs extend toward each other a slight amount and the metal of sleeve 48 is such that the prongs have a spring-action permitting their ends to be moved away from each other until they lie in line with the body-portion of the sleeve. The ends of the prongs 50 are grooved slightly and the end of plunger 29 is provided with a similar groove in line with the grooves in the prongs 50 and directly opposite the wire 44 when the latter has been fed in the opening for plunger 29 and between that plunger and the anvil 37.

Referring now to Figs. 4 to 8 inclusive, each of the four plungers 29 and die-rods 30 lie opposite one of the dies 18, and the adjacent ends of the rods 30 and members 18 have semicircular die-grooves formed thereon and facing each other. The following operations take place simultaneously on each of the four sets of ring-forming tools. Fig. 4 shows the position of the parts when the plunger 29 and rod 30 have been moved to the extreme outward position and the wire-feeding device has been actuated to feed the end of the wire across the opening for plunger 29; with the parts in this position the cross-head 23 is moved upwardly thereby turning all of the levers 25 on their pivots. This causes the die-rod 30 to move radially inward and the spring 32 moving with the die-rod causes the plunger 29 to move with the die-rod until these parts arrive at the position shown in Fig. 5. In making this movement the cutting member 46 on the plunger 29 cuts off the piece of wire lying in the opening for plunger 29, and this piece is of sufficient length to form one ring. Immediately after the piece of wire is severed it is pressed against the anvil 37 by the prongs 50 of the sleeve 48, and is bent by these prongs to the form of a staple, as shown in Figs. 5 and 6. The spring-action of the prongs 50 permits these prongs to move outwardly a slight distance, if such movement is necessary, while the ends of the prongs are passing the widest portion of the anvil 37, and immediately after the ends of the prongs pass this widest portion, their spring-action causes them to press the ends of the piece of wire alongside the inclined walls of the anvil beyond the widest portion of the latter. Just as the parts reach this position, that is, when the parts have passed slightly beyond the position in which they are shown in Fig. 5, the anvil 37 is withdrawn by the movement of plunger 29 and its coaction with lever 34. The movement of plunger 29 is then arrested but the movement of die-rod 30 continues. The sleeve 48 moves with the die-rod 30 during the latter's continued movement due to the clamping action of prongs 50 and the parts are carried to the position in which they are shown in Fig. 6. As rod 30 nears this position, the dies 18 on the mandrel are moved radially outward by the cams 22 coacting with their inner ends and as the movement of rod 30 continues the ends of the staple are carried into the semi-circular die-groove in the die 18. The ends of prongs 50, however, engage the die 18 on either side of the die-groove in the latter and as the movement of rod 30 continues the sleeve 48 remains at rest, such movement of the rod within the sleeve being permitted by the groove in the sleeve in which pin 49 is received. The movement of rod 30 continues and the ends of the staple are thereby forced into the die-groove in the die 18, the parts being then in the position in which they are shown in Fig. 7, and further movement of rod 30 causes the ends of the staple to come together and the staple to be formed into a perfect ring. Rod 30 is then moved in the opposite direction, the sleeve 48 moving with it, and when this backward movement has progressed so far that the pin engages the end of the groove 47 in plunger 29, the three parts 48, 30 and 29 move outwardly together. At the beginning of the movement of plunger 29 the bell-crank lever 34 is released so that the anvil 37 is carried to its upper position by spring 36 and at the end of the movement of the rod 30 and lever 25 the wire-feeding device is operated to feed another length of wire across the opening for plunger 29 and opposite the end of that plunger.

The support for the ring-mesh which has been made holds the mesh in such a definite relation to the forming-tools that when a staple is formed and moved forward by these tools its ends are projected through two adjacent rings of the mesh, as shown in Figs. 7 and 8, and this staple is then formed into a ring, thus adding one ring to the mesh in the proper relation to the other rings. A portion of the mesh is shown in Fig. 11 and it will be seen that ring 52 is interlinked with the two rings 53 and when another link is added below these links, it will be made to interlink with the link 52 and the link 52'. Fig. 11 shows the mesh in the form of a flat strip of the ring-mesh fabric but it will be understood that the machine as above described, makes the mesh in the form of a sleeve. From an inspection of this figure, it will be seen that the lines of rings are arranged at a slight incline to the horizontal and in the sleeve of the ring-mesh fabric this inclination is such that the lines of rings constitute a spiral around the sleeve. As the machine above described has four sets of forming-tools, the sleeve of ring-mesh has two lines of spirally arranged rows of rings each row consisting of two sets of rings, one indicated by the numerals 52, 52' and the other indicated by the numerals 53, 53'. Also it will be seen that the rings of the mesh are arranged in vertical rows and that the rings of alternate rows are inclined in opposite directions. Thus, the rings indicated by the letter A, are inclined outwardly in the downward direction and the rings of the row indicated by the letter B are inclined backwardly in the downward direction. This difference in the inclination of the rings of the finished fabric is clearly shown in Fig. 12. When the rings are made on the machine and the dies are withdrawn from a completed ring there is a natural tendency of the ring to fall to the position of the rings A, that is, the outer end of the ring will drop downwardly if it is not prevented from doing so. For this reason the rings made by two of the sets of forming-tools are allowed to fall into the position of the rings A and the rings made by the other two sets of forming-tools are caused to assume the position of the rings B. This is effected by means of small spring-fingers 54 (Fig. 4) on two of the dies 18, the ends of these fingers being turned downwardly so that they lie opposite the semi-circular die-grooves in the dies 18. Thus, when a ring is made by either of these two sets of forming-tools and the dies are withdrawn, the hook 54 of the die 18 of that set catches the inner edge of the ring and draws that edge of the ring inwardly and then releases the ring whereupon the latter falls to the position of the rings B.

By reference to Fig. 11 it will be seen that the portions of the rings A along the section line 12—12 project outwardly a slight distance beyond the portions of the rings along a line intermediate between a line through the center of the rings A and a line through the center of the rings B so that a slight depression in the ring-mesh fabric occurs along this intermediate line. It is these depressions into which the ridges upon the sleeve 5 extend in order that the sleeve 5 may cause the fabric to turn upon the mandrel 2. As the proper coaction of the member 2 with the mesh is necessary in order to cause the mesh to be accurately positioned with respect to the forming-tools, I have provided means for guarding against the relative movement of the mesh and sleeve 5 circumferentially of the mandrel such as would result in a wedging of some of the rings between the ridges on sleeve 5 and the mandrel. This is effected by causing the sleeve 5 to move intermittently in the direction of its axis, such movement resulting in causing the lines of rings to move back into proper position relatively to the ridges and depressions on member 5, if the mesh or any portion thereof has moved out of its proper position. This vertical movement of sleeve 5 may be effected in any suitable manner. Thus it may be positively moved both upwardly and downwardly by a cam action between the sleeve and the ring 3 forming a bearing therefor. The upward movement of sleeve 5, however, need not be positively effected, as this ring has a tendency to move upward as the mesh moves upward, in accordance with the threads of the mandrel 2. I have, therefore, shown only a means for moving the sleeve 5 back to its normal position. Mounted on sleeve 5 is a roller 56 adapted to coact with a projection 57 on the bottom of the ring 3. When these parts are in the position in which they are shown in Figs. 9 and 10 and the machine is operated, the sleeve 5 will be moved upwardly in accordance with the threads on mandrel 2 until the sleeve 5 has made one revolution and at the end of this revolution the roller 56 will engage the projection 57 and force the sleeve 5 downwardly. During such downward movement of sleeve 5, the mesh is caused to assume its proper position relatively to the grooves and ridges on the inner surface of sleeve 5.

The operation of the machine has been described in connection with the description of its construction but may be summarized as follows: In starting the machine I utilize a short length of ring-mesh in the form of a sleeve made by hand and this is inserted over the end of the mandrel 2, and thereafter the sleeve 5 is inserted in position. The machine is then started and at each rotation of shaft 16 a length of wire is fed forward opposite the end of each plunger 29 and the plunger 29, rod 30 and die 18 of each of the four sets of forming-tools are operated to form a ring interlinked with the rings of the fabric on mandrel 2, in the manner above described. Two of the sets of forming-tools arranged diametrically opposite each other, form the rings 52, 52' which are inclined outwardly in the downward direction and the other two sets of forming-tools form the rings 53, 53' which incline inwardly in a downward direction. After the forming-tools have operated and while they are being withdrawn, the cam 15 operates to turn the sleeve 5 one step of the ratchet wheel 7 and when sleeve 5 moves thus, it moves the sleeve of mesh with it about the stationary mandrel 2. During this rotational movement of the mesh, the latter is raised vertically an amount dependent upon the pitch of the threads on mandrel 2, so that the mesh is then in a position to have four rings added thereto meshing in the proper manner with the links already constituting parts of the fabric.

In a ring-mesh fabric of the character above described, it is highly desirable to have the ends of the piece of wire from which a ring is formed joined together, so that there will be no break in the ring, as in this way a fabric of more attractive appearance is made and one which possesses much greater strength. I have therefore provided means for welding together the ends of the wire from which a link is formed. This welding device may be of any suitable construction, as for instance, an electric welding device, by means of which an electric current is utilized to reduce the metal at the ends of a length of wire, so that these ends will become joined; or I may provide means for applying a soldering material to the ends of the wire for a link and then apply a blowpipe flame to these ends to reduce the metal thereof. Another method which I may employ is to use, in making the ring-mesh, a wire having therein a sufficient amount of soldering material to permit of welding the ends together without adding any soldering material at the joint. For this purpose I may employ only a suitable blow-pipe burner arranged in such position that the flame therefrom will play upon the ends of the piece of wire of each link. Such a blow-pipe burner is shown at 58 in Fig. 15. This burner is mounted in such position with relation to the forming-tools that as the sleeve of mesh is carried around the mandrel 2 each link stops, while another link is being formed, at such a point that the joint therein is directly opposite the burner and the burner plays upon the metal at the joint in the ring for a length of time sufficient to reduce the metal at that point and cause the ends to become joined.

In Figs. 1 to 13 inclusive I have shown a machine having four sets of forming-tools and a mandrel provided with two parallel spiral grooves. If desired, however, a greater or less number of sets of forming-tools may be employed. Thus, in Figs. 14 and 15 I have shown a machine having two sets of forming-tools and a mandrel provided with a single spiral thread. In other respects the machine shown in these figures is like that above described, with the exception that the set of forming-tools which makes the rings inclined inwardly in a downward direction is diametrically opposite that set which forms the rings which are inclined outwardly in a downward direction.

Any variation in the embodiment of my invention, such as that indicated above, I consider within the scope of my invention and I aim to cover all such modifications by the terms of the appended claims.

It will be apparent that machines differing widely in their construction from those above described may be constructed while still utilizing the principles of my invention; thus certain of the features of my invention may be employed in making ring-mesh in the form of a flat strip, such as that illustrated in Fig. 11, though I prefer to make the mesh in the form of a sleeve, as above described. These and other modifications of my invention I consider as coming within the broader aspects of my invention.

Having described my invention, what I claim as new therein and desire to secure by Letters Patent of the United States is:

1. The combination of a support for a piece of link-mesh fabric consisting of a plurality of parallel rows of intermeshing links and a plurality of parallel rows of links substantially transverse to said rows, forming-tools for forming links intermeshing with those of said fabric, means for operating said tools, and means for effecting a relative movement of said fabric bodily and said tools to present different portions of said fabric to said tools to receive links, substantially as set forth.

2. The combination of a support for a piece of link-mesh fabric consisting of a plurality of parallel rows of intermeshing links and a plurality of parallel rows of links substantially transverse to said rows, forming-tools for forming links intermeshing with those of said fabric, means for feeding wire to said tools, a cutter for the wire, means for operating the tools, and means for effecting a relative bodily movement of said fabric and said tools to present different portions of said fabric to the tools to receive links, substantially as set forth.

3. The combination of a support for a piece of link-mesh fabric, link-forming devices, means for operating said devices to form links and intermesh each of said links with a plurality of the links of the fabric, and means for moving said support and said link-forming devices relatively, substantially as set forth.

4. The combination of a support for a piece of link-mesh fabric, link-forming devices, means for feeding wire thereto, a cutter for the wire, means for operating said devices to form links from the pieces of wire and intermesh each of the links with a plurality of the links of said fabric, and means for moving said support and said link-forming devices relatively, substantially as set forth.

5. The combination of a support for a series of intermeshing links, forming-tools, means for moving said intermeshing links and said tools relatively, and means for actuating said tools to automatically form a staple, then link said staple with said intermeshing links and then form said staple into a link, substantially as set forth.

6. The combination of a support for a series of intermeshing links, forming-tools, means for moving said intermeshing links and said tools relatively, means for feeding wire to said forming-tools, means for severing said wire, and means for operating said forming tools to automatically form a staple from a piece of the wire thus severed, then link said staple with said intermeshing links and then form said staple into a link, substantially as set forth.

7. The combination of means for supporting a piece of link-mesh fabric consisting of a plurality of parallel rows of intermeshing links and a plurality of parallel rows of links substantially transverse to said rows, forming-tools for forming links intermeshing with the links of said fabric, means for moving said supporting means and said tools relatively to present different portions of said fabric to said tools to receive links, and means for operating said tools to form a staple, link said staple with said intermeshing links, and form said staple into a link, substantially as set forth.

8. The combination of means for supporting a piece of link-mesh fabric, forming-tools, means for moving said tools and said supporting means relatively, and means for operating said forming-tools to form a staple, link said staple with a plurality of the links of said fabric and form said staple into a link, substantially as set forth.

9. The combination of a support for a piece of link-mesh fabric consisting of a plurality of parallel rows of intermeshing links and a plurality of parallel rows of links substantially transverse to said rows, forming-tools for forming links intermeshing with the links of said fabric, means for moving said support and said tools relatively to present different portions of said fabric to said tools to receive links, and means for operating said tools to form links, each link meshing with a plurality of the links of said fabric, substantially as set forth.

10. The combination of means for supporting a piece of link-mesh fabric consisting of a plurality of rows of intermeshing links and a plurality of parallel rows of links substantially transverse to said rows, a pair of die-members mounted on opposite sides of the fabric supported by said means, means for moving said supporting means and said die-members relatively to present different portions of said fabric to said die-members, and means for moving said die-members relatively toward and away from each other to form links intermeshing with the links of said fabric, substantially as set forth.

11. The combination of means for supporting a piece of link-mesh fabric consisting of a plurality of rows of intermeshing links and a plurality of parallel rows of links substantially transverse to said rows, a pair of die-members mounted on opposite sides of the fabric supported by said means, means for moving said supporting means and said die-members relatively to present different portions of said fabric to said die-members, and means for moving said die-members relatively toward and away from each other to form links and intermesh each of said links with a plurality of the links of said fabric, substantially as set forth.

12. The combination of means for supporting a piece of link-mesh fabric consisting of a plurality of rows of intermeshing links and a plurality of parallel rows of links substantially transverse to said rows, a pair of die-members mounted on opposite sides of the fabric supported by said means, means for moving said supporting means and said die-members relatively to present different portions of said fabric to said die-members, means for feeding wire to said tools, a cutter for the wire, and means for moving said die-members relatively toward and away from each other to form a staple, intermesh said staple with a plurality of the links of said fabric and then form said staple into a link, substantially as set forth.

13. The combination of a support for a piece of link-mesh fabric consisting of a plurality of parallel rows of intermeshing links and a plurality of parallel rows of links substantially transverse to said rows, forming-tools for forming links intermeshing with those of said fabric, means for operating said tools, and means for effecting a relative movement of said fabric bodily and said tools about an axis to present different portions of said fabric to said tools to receive links, substantially as set forth.

14. The combination of means for supporting a piece of link-mesh fabric consisting of a plurality of parallel rows of intermeshing links and a plurality of parallel rows of links substantially transverse to said rows, forming-tools, means for moving said tools and said supporting means relatively about an axis to present different portions of said fabric to said tools to receive links, and means for operating said tools to form a staple, interlink said staple with a plurality of the links of said fabric and form said staple into a link, substantially as set forth.

15. The combination of a support for a piece of link-mesh fabric, a pair of die-members mounted on opposite sides of said piece of fabric, means for moving said support and said die-members relatively about an axis, means for feeding wire to said die-members, a cutter for the wire, and means for moving said die-members relatively toward and away from each other to form links from said wire, each intermeshing with a plurality of the links of said fabric, substantially as set forth.

16. The combination of means for supporting a piece of link-mesh fabric consisting of a plurality of parallel rows of intermeshing links and a plurality of parallel rows of links substantially transverse to said rows, forming-tools, automatic means for moving said tools and said supporting means relatively to present different portions of said fabric to said tools, and means for operating said tools automatically to form links intermeshing with the links of said fabric and arranged in substantially parallel rows, substantially as set forth.

17. The combination of means for supporting a piece of link-mesh fabric consisting of a plurality of parallel rows of intermeshing links and a plurality of parallel rows of links substantially transverse to said rows, forming-tools, means for operating said tools automatically to form a staple, interlink said staple with a plurality of the links of said fabric and form said staple into a link, and means for automatically moving said tools and said supporting means relatively to present different portions of said fabric to said tools and arrange the links formed by said tools in substantially parallel rows, substantially as set forth.

18. The combination of means for supporting a piece of link-mesh fabric, a pair of die-members mounted on opposite sides of said piece of fabric, means for feeding wire to said die-members, means for cutting the wire, means for moving the die-members toward and away from each other to form links from said wire each meshing with a plurality of the links of said fabric, and means for automatically moving said supporting means and said die-members relatively to present different portions of the fabric to said tools and arrange the links formed by said die-members in substantially parallel rows, substantially as set forth.

19. The combination of a support for a piece of link-mesh fabric, forming-tools, means for moving said fabric and said tools relatively in the direction of the length and in the direction of the width of the fabric, and means for operating said tools to form links on said fabric each interlinked with a plurality of other links, substantially as set forth.

20. The combination of a support for a piece of link-mesh fabric, forming-tools, means for moving said fabric and said tools relatively in the direction of the length and in the direction of the width of the fabric, means for feeding wire to said forming-tools, and means for operating said tools to form links on said fabric each interlinked with a plurality of other links, substantially as set forth.

21. The combination of means for supporting a piece of link-mesh fabric, forming-tools, means for moving said fabric and said tools relatively in the direction of the length and in the direction of the width of the fabric, means for feeding wire to said forming-tools, means for severing from said wire a piece for a link, and means for operating said tools to form links on said fabric each interlinked with a plurality of other links, substantially as set forth.

22. The combination of means for supporting a piece of link-mesh fabric, forming-tools, means for moving said fabric and said tools relatively in the direction of the length and in the direction of the width of the fabric, means for feeding wire to said forming-tools, and means for operating said tools to sever pieces from said wire and form the pieces so severed into links meshing with those of said fabric, substantially as set forth.

23. The combination of means for supporting a piece of link-mesh fabric, forming-tools, means for moving said fabric and said tools relatively in the direction of the length and in the direction of the width of the fabric, and means for operating said forming-tools to form staples, link said staples with the links of said fabric, and form said staples into links, substantially as set forth.

24. The combination of means for supporting a piece of link-mesh fabric, forming-tools, means for moving said fabric and said tools relatively in the direction of the length and in the direction of the width of the fabric, means for feeding wire to said tools, means for severing pieces from said wire, and means for operating said forming tools to form staples, link said staples with the links of said fabric, and form said staples into links, substantially as set forth.

25. The combination of means for supporting a piece of link-mesh fabric, a pair of forming-tools located on opposite sides of the fabric on said support, means for moving said fabric and said tools relatively in the direction of the length and in the direction of the width of the fabric, and means for moving said tools toward and away from each other to form links intermeshing with the links of said fabric, substantially as set forth.

26. The combination of means for supporting a piece of link-mesh fabric, a pair of forming-tools located on opposite sides of the fabric on said support, means for moving said fabric and said tools relatively in the direction of the length and in the direction of the width of the fabric, means for feeding wire to said forming-tools, means for severing said wire, and means for moving said tools toward and away from each other to form links interlinked with the links of said fabric, substantially as set forth.

27. The combination of means for supporting a piece of link-mesh fabric, a pair of forming-tools located on opposite sides of the fabric on said support, means for moving said fabric and said tools relatively in the direction of the length and in the direction of the width of the fabric, and means for operating said tools to form staples, interlink said staples with the links of said fabric, and form said staples into links, substantially as set forth.

28. The combination of means for supporting a piece of link-mesh fabric, a pair of forming-tools located on opposite sides of the fabric on said support, means for moving said fabric and said tools relatively in the direction of the length and in the direction of the width of the fabric, means for feeding wire to said tools, and means for moving said tools toward and away from each other to sever a piece from wire, form said piece into a staple, interlink said staple with the links of said fabric, and form said staple into a link, substantially as set forth.

29. The combination of means for supporting a piece of link-mesh fabric consisting of a plurality of parallel rows of intermeshing links and a plurality of parallel rows of links substantially transverse to said rows, forming-tools, means for automatically moving said supporting means and said tools relatively step by step to present different portions of said piece of fabric to said tools, and means for operating said tools automatically during the intervals of rest of said step by step movement to form links meshing with the links of said fabric, substantially as set forth.

30. The combination of means for supporting a piece of link-mesh fabric consisting of a plurality of parallel rows of intermeshing links and a plurality of parallel rows of links substantially transverse to said rows, forming-tools, means for automatically moving said supporting means and said tools relatively step by step to present different portions of said piece of fabric to said tools, means for feeding wire to said tools, a cutter for the wire, and means for operating said tools automatically during the intervals of rest of said step by step movement to form links each meshing with a plurality of the links of said fabric, substantially as set forth.

31. The combination of means for supporting a piece of link-mesh fabric consisting of a plurality of parallel rows of intermeshing links and a plurality of parallel rows of links substantially transverse to said rows, forming-tools, means for automatically moving said supporting means and said tools relatively step by step to present different portions of said piece of fabric to said tools, and means for operating said tools automatically during the intervals of rest of said step by step movement to form a staple, link said staple with a plurality of the links of said fabric and form said staple into a link, substantially as set forth.

32. The combination of means for supporting a piece of link-mesh fabric consisting of a plurality of parallel rows of intermeshing links and a plurality of parallel rows of links substantially transverse to said rows, forming-tools, means for automatically moving said supporting means and said tools relatively step by step to present different portions of said piece of fabric to said tools, and means for operating said tools automatically during the intervals of rest of said step by step movement to form links meshing with the links of said fabric, the relative movement of said supporting means and said tools being such that the links formed by said tools are arranged in substantially parallel rows, substantially as set forth.

33. The combination of means for supporting a piece of link-mesh fabric consisting of a plurality of parallel rows of intermeshing links and a plurality of parallel rows of links substantially transverse to said rows, forming-tools, means for automatically moving said supporting means and said tools relatively step by step in the direction of the width and the direction of the length of said piece of fabric, and means for operating said tools automatically during the intervals of rest of said step by step movement to form links meshing with the links of said fabric, substantially as set forth.

34. The combination of a support for a circular piece of link-mesh, forming-tools, means for moving said piece and said tools relatively about the axis of said piece, and means for operating said tools to form links interlinked with the links of said mesh, substantially as set forth.

35. The combination of a support for a circular piece of link-mesh, forming-tools, means for moving said piece and said tools relatively about the axis of said piece, means for feeding wire to said tools, means for severing said wire, and means for operating said tools to form links interlinked with the links of said mesh, substantially as set forth.

36. The combination of a support for a circular piece of link-mesh, forming-tools, means for moving said piece and said tools relatively about the axis of said piece, and means for operating said tools to form a staple, link said staple with the links of said mesh, and form said staple into a link, substantially as set forth.

37. The combination of a support for a circular piece of link-mesh, forming-tools, means for moving said piece and said tools relatively in the direction of the axis of said piece and in a direction substantially transverse thereto, and means for operating said tools to form links interlinked with the links of said mesh, substantially as set forth.

38. The combination of a support for a circular piece of link-mesh, forming-tools, means for moving said piece and said tools relatively about the axis of said piece by a step-by-step movement, and means for operating said tools to form links interlinked with the links of said mesh during the intervals of rest of said step-by-step movement, substantially as set forth.

39. The combination of a mandrel for supporting a circular piece of link-mesh, means for rotating said piece upon said mandrel, means for moving said piece in the direction of its axis, forming-tools, and means for operating said tools for forming links interlinked with those of said piece, substantially as set forth.

40. The combination of a mandrel for supporting a circular piece of link-mesh, means for rotating said piece upon said mandrel, means for moving said piece in the direction of its axis, forming-tools, means for feeding wire to said tools, means for severing said wire, and means for operating said tools to form links interlinked with the links of said mesh, substantially as set forth.

41. The combination of a mandrel for supporting a circular piece of link-mesh, means for rotating said piece upon said mandrel, means for moving said piece in the direction of its axis, forming-tools and means for operating said tools to form a staple, link said staple with the links of said mesh, and form said staple into a link, substantially as set forth.

42. The combination of a mandrel for supporting a circular piece of link-mesh, means for rotating said piece upon said mandrel by a step-by-step movement, means for moving said piece in the direction of its axis, forming-tools for forming links interlinked with the links of said mesh, and means for operating said tools during the intervals of rest of said step-by-step movement, substantially as set forth.

43. The combination of a mandrel having a spiral thread formed on the surface thereof, said mandrel being adapted to support a circular piece of link-mesh, means for rotating said piece upon said mandrel, forming-tools, and means for operating said tools to form links interlinked with those of said mesh, substantially as set forth.

44. The combination of a mandrel having a spiral thread formed on the surface thereof, said mandrel being adapted to support a circular piece of link-mesh, means for rotating said mesh upon said mandrel, forming-tools, means for feeding wire to said tools, means for severing said wire, and means for operating said tools to form links interlinked with the links of said mesh, substantially as set forth.

45. The combination of a mandrel having a spiral thread formed on the surface thereof, said mandrel being adapted to support a circular piece of link-mesh, means for rotating said piece upon said mandrel, forming-tools, and means for operating said tools to form a staple, link said staple with the links of said mesh, and form said staple into a link, substantially as set forth.

46. The combination of a mandrel having a spiral thread formed thereon, said mandrel being adapted to receive a circular piece of link-mesh, means for rotating said piece upon said mandrel step by step, forming-tools, and means for operating said tools to form links interlinked with those of said mesh during the intervals of rest of said step-by-step movement, substantially as set forth.

47. The combination of a mandrel having a spiral thread formed thereon, said mandrel being adapted to receive a circular piece of link-mesh, means for rotating said piece upon said mandrel step by step, forming-tools, and means for operating said tools during the intervals of rest of said step-by-step movement to form a staple, link said staple with the links of said mesh, and form said staple into a link, substantially as set forth.

48. The combination of a mandrel having a spiral thread formed thereon, said mandrel being adapted to receive a circular piece of link-mesh, means for rotating said piece upon said mandrel step by step, forming-tools, means for feeding wire to said tools, means for severing said wire, and means for operating said tools during the intervals of rest of said step-by-step movement to form a staple, link said staple with the links of said mesh and form said staple into a link, substantially as set forth.

49. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member, forming-tools, and means for operating said tools to form links interlinked with those of said mesh, substantially as set forth.

50. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member step by step, forming-tools, and means for operating said tools while said member is at rest, substantially as set forth.

51. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member, forming-tools, means for feeding wire to said tools, means for cutting said wire, and means for operating said tools, substantially as set forth.

52. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member, forming tools, and means for operating said tools to form a staple, link said staple with the links of said mesh, and form said staple into a link, substantially as set forth.

53. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member, a die located within said mandrel, a die located opposite said die, and means for moving said dies toward and away from each other, substantially as set forth.

54. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member, a die, means for moving the same toward and away from said mandrel, a forming-member normally located in the path of said die, and means for automatically moving said forming-member to permit said die to pass it, substantially as set forth.

55. The combination of means for supporting a piece of link-mesh, a die, means for moving said piece and said die relatively, means for operating said die to form links meshing with the links of said mesh, and a projection on said die adapted to engage a link and position the same relatively to said mesh, substantially as set forth.

56. The combination of means for supporting a piece of link-mesh, two pairs of dies, means for moving said piece and said dies relatively, means for moving the dies of said pairs toward and away from each other to form links interlinked with those of said mesh, and a projection on one of the dies of one of said pairs adapted to engage a link made by said pair of dies and position the link with respect to the links of said piece, substantially as set forth.

57. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for rotating said member, means for moving said member in the direction of the axis, and forming-tools for forming links interlinked with those of said piece, substantially as set forth.

58. In a machine for making link-mesh, a die-rod having a die formed thereon, a die opposite said die, a sleeve on said die-rod, yielding prongs on the end of said sleeve normally inclined toward each other, a forming-member normally located opposite the end of said die-rod, and means for moving said forming-member, substantially as set forth.

59. The combination of means for supporting a circular piece of link-mesh, forming-tools, means for moving said piece and said tools relatively in the direction of the axis of said piece and in a direction substantially transverse thereto, means for feeding wire to said tools, means for cutting the wire, and means for operating said tools to form links each interlinked with a plurality of the links of said piece, substantially as set forth.

60. The combination of means for supporting a circular piece of link-mesh, forming-tools, means for moving said piece and said tools relatively in the direction of the axis of said piece, means for moving said piece and said tools relatively about said axis, and means for operating said tools to form links each interlinked with a plurality of the links of said piece, substantially as set forth.

61. The combination of means for supporting a circular piece of link-mesh, forming-tools, means for moving said piece and said tools relatively about the axis of said piece step by step, means for moving said tools and said piece in the direction of the axis of said piece, and means for operating said tools during the intervals of rest of said step by step movement to form links each interlinked with a plurality of the links of said mesh, substantially as set forth.

62. The combination of means for supporting a circular piece of link-mesh, forming-tools, means for operating said tools to form links each meshing with a plurality of the links of said mesh, and means for moving said piece and said tools relatively so that the links formed by said tools are arranged in rows around said circular piece of mesh, substantially as set forth.

63. The combination of means for supporting a circular piece of link-mesh, forming-tools, means for operating said tools to form links each meshing with a plurality of the links of said mesh, and means for moving said piece and said tools relatively step by step so that the links formed by said tools are arranged in rows around said circular piece of mesh, said tools being operated in the intervals of rest of said step by step movement, substantially as set forth.

64. The combination of means for supporting a piece of link-mesh, forming-tools, means for operating said tools to form links each interlinked with a plurality of the links of said mesh, means for moving said piece and said tools relatively, and means for causing a link formed by said tools to assume a predetermined angular relation with respect to the surface of said mesh, substantially as set forth.

65. The combination of means for supporting a piece of link-mesh, two sets of forming-tools, means for operating said sets of tools to form links meshing with the links of said piece, means for moving said piece and said sets of tools relatively, and means for causing the links formed by one of said sets of tools to assume a predetermined angular relation with respect to the surface of said mesh, substantially as set forth.

66. The combination of means for supporting a piece of link-mesh, forming-tools, means for operating said tools to form links interlinked with those of said mesh, means for moving said piece and said tools relatively in one direction, means for moving said piece and said tools relatively in a direction substantially transverse thereto, and means for causing a link to assume a predetermined relation with respect to the surface of said mesh, substantially as set forth.

67. The combination of means for supporting a piece of link-mesh, forming-tools, means for moving said piece and said tools relatively step by step in one direction, means for moving said tools and said piece relatively in a direction substantially transverse thereto, means for operating said tools during the intervals of rest of said step by step movement to form links meshing with the links of said mesh, and means for causing a link formed by said tools to assume a predetermined relation with respect to the surface of said mesh, substantially as set forth.

68. The combination of a pair of die-members, means for reciprocating one of said die-members to carry it into and out of coaction with the other of said members, an anvil movable into and out of the path of movement of said reciprocating die-member, means for moving the anvil, and means for feeding wire between the end of said reciprocating die-member and said anvil, substantially as set forth.

69. The combination of means for supporting a series of intermeshing links, die-members mounted on opposite sides of said links, means for reciprocating one of said members, an anvil movable into and out of the path of movement of said reciprocating die-member, means for moving the anvil, and means for feeding wire between the anvil and the end of said reciprocating die-member, substantially as set forth.

70. The combination of a pair of die-members, means for reciprocating one of said die-members to carry it into and out of coaction with the other of said members, an anvil movable into and out of the path of movement of said reciprocating die-member, means for moving the anvil, and means for feeding wire between the end of said reciprocating die-member and said anvil, said reciprocating die-member having elastic fingers on the end thereof adapted to engage said wire and form the same about said anvil, substantially as set forth.

71. The combination of a pair of die-members, means for reciprocating one of said die-members to carry it into and out of coaction with the other of said members, a sleeve movable upon the end of said reciprocating die-member and having elastic fingers at the end thereof, an anvil movable into and out of the path of movement of said reciprocating die-member, means for moving said anvil, and means for feeding wire between said fingers and said anvil, substantially as set forth.

72. The combination of means for supporting a series of intermeshing links, a pair of die-members mounted on opposite sides of said series of links, means for reciprocating one of said members to carry it into and out of coaction with the other member to form a link between them intermeshing with a link of said series, and a projection on said reciprocating die-member in position to project within a link formed by the die-members and to engage said link when the reciprocating die-member is retracted, substantially as set forth.

73. The combination of means for supporting a piece of link-mesh fabric, forming-tools, means for moving said fabric and said tools relatively in the direction of the length and in the direction of the width of the fabric, means for operating said tools to form links interlinked with those of said fabric, and means for soldering together the ends of the links made by said tools, substantially as set forth.

74. The combination of a support for a circular piece of link-mesh, forming tools, means for moving said piece and said tools relatively about the axis of said piece, means for operating said tools to form links interlinked with those of said mesh, and means for soldering together the ends of a link made by said tools, substantially as set forth.

75. The combination of a mandrel for supporting a circular piece of link-mesh, means for rotating said piece, means for moving said piece in the direction of its axis, forming-tools, means for operating said tools for forming links interlinked with those of said piece, and means for soldering together the ends of a link made by said tools, substantially as set forth.

76. The combination of a mandrel having a thread formed on the surface thereof, a member extending about said mandrel and having projections formed on the surface thereof adjacent to the threaded surface of the mandrel, said mandrel and member being adapted to receive between them a circular piece of link-mesh, means for operating said tools to form links interlinked with those of said mesh, and means for soldering together the ends of a link made by said tools, substantially as set forth.

77. The combination of means for supporting a piece of link-mesh fabric consisting of a plurality of parallel rows of intermeshing links and a plurality of parallel rows of links substantially transverse to said rows, forming-tools for forming links intermeshing with the links of said fabric, means for operating said tools, means for moving said supporting means and said tools relatively to present different portions of said fabric to said tools to receive links, and means for soldering together the ends of the links formed by said tools, substantially as set forth.

78. The combination of means for supporting a piece of link-mesh fabric, link-forming devices, means for operating said devices to form links and intermesh each of said links with a plurality of the links of the fabric, means for moving said supporting means and said link-forming devices relatively, and means for soldering together the ends of the links formed by said tools, substantially as set forth.

79. The combination of a support for a series of intermeshing links, forming-tools, means for moving said intermeshing links and said tools relatively, means for automatically actuating said tools to form a staple, then link said staple with said intermeshing links and then form said staple into a link, and means for soldering together the ends of the links formed by said tools, substantially as set forth.

80. The combination of means for supporting a piece of link-mesh fabric consisting of a plurality of parallel rows of intermeshing links and a plurality of parallel rows of links substantially transverse to said rows, forming-tools, automatic means for moving said tools and said supporting means relatively to present different portions of said fabric to said tools, means for operating said tools automatically to form links intermeshing with the links of said fabric and arranged in substantially parallel rows, and means for soldering together the ends of the links formed by said tools, substantially as set forth.

81. The combination of means for supporting a piece of link-mesh fabric, forming-tools, means for moving said fabric and said tools relatively in the direction of the length and the direction of the width of the fabric, means for operating said tools to form links on said fabric each interlinked with a plurality of other links, and means for soldering together the ends of the links formed by said tools, substantially as set forth.

82. The combination of a support for a circular piece of link-mesh, forming-tools, means for moving said piece and said tools relatively in the direction of the axis of said piece and in a direction substantially transverse thereto, means for operating said tools to form links interlinked with the links of said mesh, and means for soldering together the ends of the links formed by said tools, substantially as set forth.

83. The combination of means for supporting a piece of link-mesh fabric consisting of a plurality of parallel rows of intermeshing links and a plurality of parallel rows of links substantially transverse to said rows, forming-tools, means for automatically moving said supporting means and said tools relatively step by step to present different portions of said piece of fabric to said tools, means for operating said tools automatically during the intervals of rest of said step by step movement to form links meshing with the links of said fabric, and means for soldering together the ends of the links formed by said tools, the relative movement of said supporting means and said tools being such that the links formed by said tools are arranged in substantially parallel rows, substantially as set forth.

This specification signed and witnessed this 5th day of March, 1909.

A. COMSTOCK PRATT.

Witnesses:
    ROSALIE KAPLAN,
    L. T. TOUSSAINT, Jr.